United States Patent
Neary et al.

(10) Patent No.: US 7,397,494 B2
(45) Date of Patent: Jul. 8, 2008

(54) SCAN LINEARITY CORRECTION PARAMETERS ADDRESSING ROM ADDRESS BITS

(75) Inventors: Michael B. Neary, Manhattan Beach, CA (US); Daniel Wong, San Gabriel, CA (US)

(73) Assignee: Xerox Corporation, Norwalk, CT (US)

( * ) Notice: Subject to any disclaimer, the term of this patent is extended or adjusted under 35 U.S.C. 154(b) by 284 days.

(21) Appl. No.: 11/211,703

(22) Filed: Aug. 26, 2005

(65) Prior Publication Data

US 2007/0046768 A1     Mar. 1, 2007

(51) Int. Cl.
*B41J 2/435*     (2006.01)
*B41J 2/47*     (2006.01)
*B41J 2/385*     (2006.01)

(52) U.S. Cl. .................. 347/248; 347/234; 347/116

(58) Field of Classification Search ............. 347/116, 347/229, 234–235, 240, 248–250; 327/156; 358/2.1

See application file for complete search history.

(56) References Cited

U.S. PATENT DOCUMENTS

| | | | | |
|---|---|---|---|---|
| 6,157,400 | A * | 12/2000 | Genovese | 347/250 |
| 6,519,055 | B1 * | 2/2003 | Curry et al. | 358/2.1 |
| 6,529,055 | B1 * | 3/2003 | Neary | 327/156 |
| 6,608,643 | B2 * | 8/2003 | Lofthus et al. | 347/240 |
| 6,933,957 | B2 * | 8/2005 | Omori et al. | 347/249 |
| 2006/0268098 | A1 * | 11/2006 | Baretsky et al. | 347/249 |

* cited by examiner

*Primary Examiner*—Hai C Pham
(74) *Attorney, Agent, or Firm*—MH2 Technology Law Group LLP

(57) ABSTRACT

This invention relates to an efficient way to calibrate and control a raster output scanner (ROS). The scan non-linearity of a ROS may be measured and an appropriate calibration curve setting for the ROS may be determined. The setting and other scan line parameters may then be used as an address to a memory, such as a read-only memory (ROM). The memory may store a set of calibration curve data and the address is used to look up the data from one of these curves. The ROS may then be controlled based on the calibration data retrieved from memory.

12 Claims, 4 Drawing Sheets

SCAN LINEARITY CORRECTION PARAMETERS ADDRESSING ROM ADDRESS BITS

FIELD

The present invention relates generally to scan line non-linearity in a Raster Output Scanning (ROS) system. More particularly, the present invention relates to correcting for scan line non-linearity in a ROS.

BACKGROUND OF THE INVENTION

Printing systems utilizing lasers to reproduce information are well known in the art. These printing systems typically use one or more Raster Output Scanners (ROS) to expose the charged portions of a photosensitive medium, such as a photoreceptor, to record an electrostatic latent image. The photosensitive medium is exposed to a toner, which is attracted to the electrostatic latent image. The toner may then be transferred to the print medium, such as sheet of paper, to reproduce the image.

Typically, an ROS will build the electrostatic latent image onto the photosensitive medium using a series of scan lines. Printing systems may also use multiple ROS units to form the image on the photosensitive medium. For example, color printing systems may use a plurality of ROS units, where each ROS forms a scan line for a separate color. Thus, it is important that the ROS units operate precisely and accurately. For example, registration of each scan line of ROS units in a color printing system can be required to be within a 0.1 mm circle or within a tolerance of .+-.0.05 mm.

Ideally, a ROS should be capable of exposing a line of evenly spaced, identical pixels on the photosensitive medium. In order to form these pixels, a ROS focuses its light beam into a spot along a scan line on the photosensitive medium. The speed at which a ROS scans along a scan line is known as the spot velocity.

However, the inherent geometry of the optical system used in a ROS makes obtaining evenly spaced, identical pixels problematic. Common manufacturing variances and errors may also cause inaccuracies by an ROS. These shortcomings in a typical ROS result in errors known as "scan non-linearity." Scan non-linearity refers to the deviations in uniform pixel placement by a ROS along a scan line.

Scan non-linearity results in a poorer image quality. For example, scan non-linearity can cause mis-registration between colors in a multiple ROS laser printer. Therefore, many known systems include scan non-linearity correction mechanisms.

Unfortunately, such correction mechanisms can be difficult to implement. For example, the non-linearity signature varies from ROS to ROS. Thus, each ROS must be separately measured and adjusted by a technician to correct its scan non-linearity. This calibration process can also be tedious and time consuming. In addition, over the lifetime of operation, the scan non-linearity of a ROS may vary or change. This may render the implemented correction obsolete or ineffective.

Accordingly, it would be desirable to provide methods and systems that are capable of efficiently correcting scan non-linearity in a ROS. In addition, it would be desirable to provide an efficient process for calibrating a ROS to correct or minimize its scan non-linearity.

SUMMARY OF THE INVENTION

An embodiment of the invention generally relates to a method of calibrating an imaging device where the imaging device holds a plurality of calibration profiles. Each calibration profile can be identified from a configuration setting. The method includes measuring a scan non-linearity profile of the imaging device and determining a calibration profile from the plurality of calibration profiles that corrects the scan non-linearity profile. The method also includes determining a configuration setting that corresponds to the calibration profile and calibrating the imaging device based on entering the configuration setting.

Another embodiment generally pertains to a method of correcting a scan non-linearity of an imaging device. The method includes determining a current position along a scan line and retrieving a setting of the imaging device that identifies one of a plurality calibration profiles stored on the imaging device. The method also includes determining an address for calibration data based on the current position and the retrieved setting and retrieving the calibration data based on the address. The method further includes controlling an output of the imaging device based on the calibration data.

Yet another embodiment of the invention generally relates to an imaging device configured to correct its scan non-linearity. The image device includes means for determining a current position along a scan line and means for retrieving a setting of the imaging device. The imaging device also includes means for determining an address for calibration data based on the current position and the retrieved setting and means for retrieving the calibration data based on the address. The imaging device further includes means for controlling an output of the imaging device based on the calibration data.

Yet another embodiment pertains generally to an imaging device. The imaging device includes a memory configured to hold a plurality of calibration profiles and a state machine. The state machine is configured to determine a current position along a scan line, retrieve a setting that identifies one of the calibration profiles, and retrieve calibration data from the memory based on an address that is based on the current position and the setting. The imaging device also includes an encoder configured to convert the calibration data into a voltage and a signal generator configured to output a control signal with a frequency that is based on the voltage from the encoder. The imaging device further includes a light source that emits light based on the control signal.

Additional features of some embodiments of the invention will be set forth in part in the description which follows, and in part will be obvious from the description, or may be learned by practice of the invention. The features of some embodiments of the invention can be realized and attained by the elements and combinations set forth in the appended claims.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate some embodiments of the invention and together with the description, may serve to explain the principles of the invention. In the figures.

DESCRIPTION OF THE EMBODIMENTS

Embodiments of the present invention provide an efficient way to calibrate and control a ROS. For example, a technician may measure the scan non-linearity of a ROS. The technician may then determine an appropriate calibration curve for the ROS and enter a setting. In some embodiments, the calibration setting entered by the technician and other scan line parameters may then be used as an address to a memory, such as a read-only memory (ROM). The memory may store a set of calibration curve data and the address is used to look up the data from one of these curves. The ROS may then be controlled based on the calibration data retrieved from memory.

In the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Reference will now be made in detail to some embodiments of the invention, which are illustrated in the accompanying drawings. Wherever possible, the same reference numbers will be used throughout the drawings to refer to the same or like parts. For simplicity and illustrative purposes, the principles of the present invention are described by referring mainly to exemplary embodiments thereof.

Figure 1:
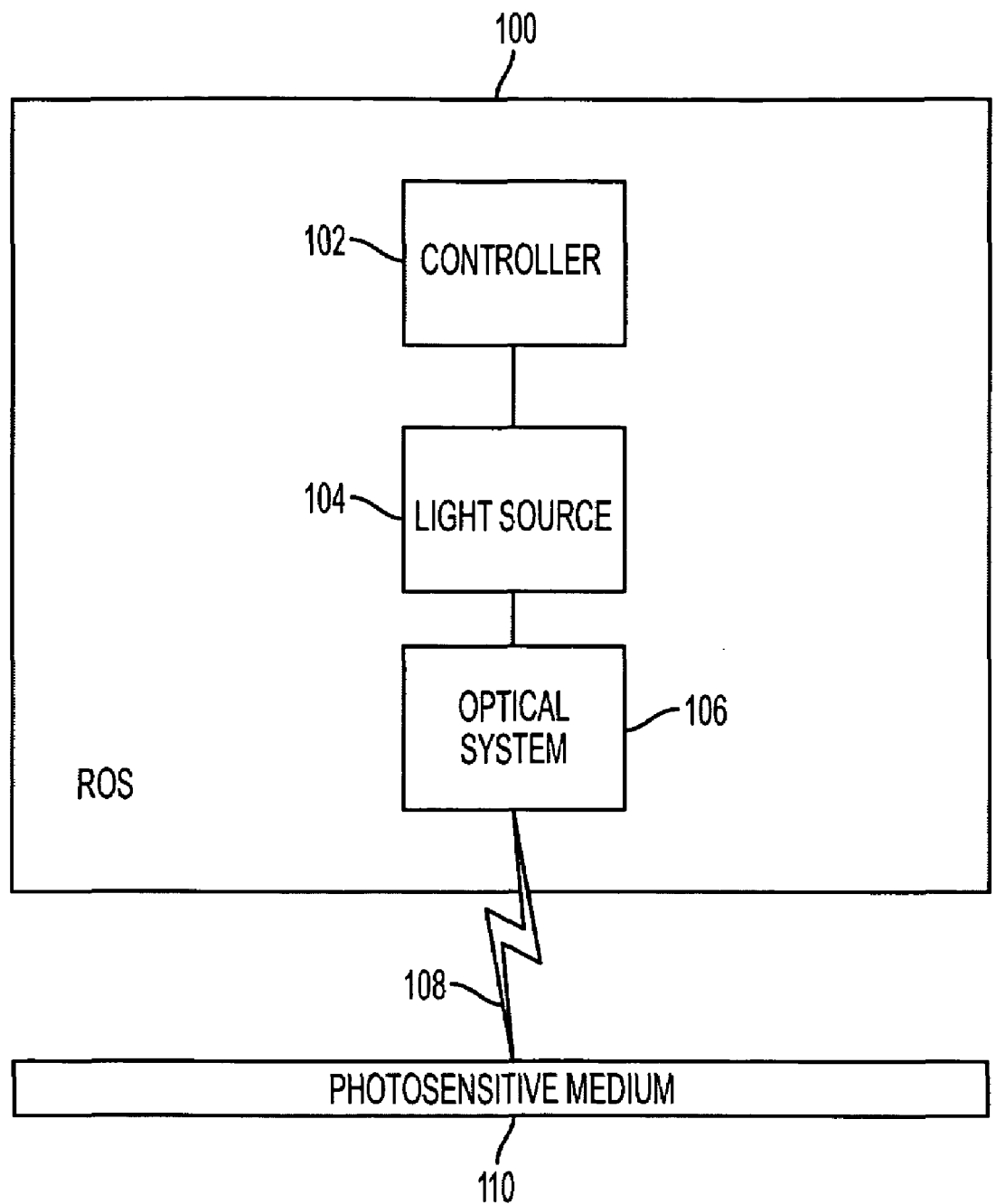
FIG. 1 illustrates an exemplary system that is in accordance with embodiments of the present invention.

FIG. 1 illustrates an exemplary system that is in accordance with embodiments of the present invention. In particular, the system may be an imaging device, such as a ROS 100, which may also be part of a printing system (not shown). As shown, ROS 100 may comprise a controller 102, a light source 104, and an optical system 106.

In general, ROS 100 is designed to direct a light beam 108 onto photosensitive medium 110 in order to form an electrostatic latent image, which is then reproduced on a print medium and the like. In particular, ROS 100 may direct light beam 108 along a series of scan lines and pulse light beam 108 to form pixels that are evenly spaced along the scan line. Some of the components of ROS 100 will now be further described.

Controller 102 controls the operation of ROS 100 and, as noted, attempts to provide uniformly spaced, identical pixels along a scan line. For example, controller 102 may command light source 104 to pulse its emitted light at desired positions of a scan line, such as the central portion of each pixel position. Assuming a constant scan line interval, controller 102 may determine the current scan line position based on relative time within the scan line interval, which may also be expressed in terms of frequency values.

Accordingly, in some embodiments, controller 102 may be configured so that its control signal defines a pixel interval for each pixel position and so that the pixel interval defined by the control signal varies proportionately according to spot velocity, i.e., a higher frequency at the ends of the scan line than toward the center. For that purpose, controller 102 may modulate its control signal using the pixel clock frequency as a reference and based on the spot position.

In order to modulate its control signal based on the pixel clock, controller 102 may utilize well known calibration curves that provide a frequency profile versus relative time within a scan line interval (which corresponds to a scan line position). In some embodiments, the data of these calibration curves are stored within a memory of ROS 100, which is illustrated and described with reference to FIG. 2.

In addition, controller 102 may be configured to detect the start and end of a scan line interval. For example, controller 102 may be configured to respond to a start-of-scan (SOS) control signal or other synchronizing signal. Such a signal may be produced using well known components, such as counter or other type of timing logic, within controller 102.

Controller 102 may be implemented using well known components of hardware and/or software. For example, controller 102 may be implemented using state machines such as field programmable gate array (FPGA) components, complex programmable logic devices (CPLD), standard logic gates, application specific integrated circuits (ASICs), microprocessors, digital signal processors or other device capable of implementing state machines.

Light source 104 emits a coherent beam of light. Light source 104 may be implemented using well known components, such as a laser diode that emits a modulated coherent light beam of a single wavelength.

Optical system 106 forms the light emitted from light source 104 into light beam 108 and routes along a scan line. Optical system 106 may be implemented using well known components. For example, optical system 106 may comprise a polygon mirror (not shown) that is rotated by a conventional motor (not shown). Light from light source 104 reflect off of facets of the rotating polygon mirror and may then be passed through a series of lenses (not shown) to form light beam 108, which is focused onto photosensitive medium 110. Light beam 108 is modulated based on the operations of controller 102 to produce individual bursts of light that expose a line of individual pixels, or spots, on the photosensitive medium 110.

Figure 2:
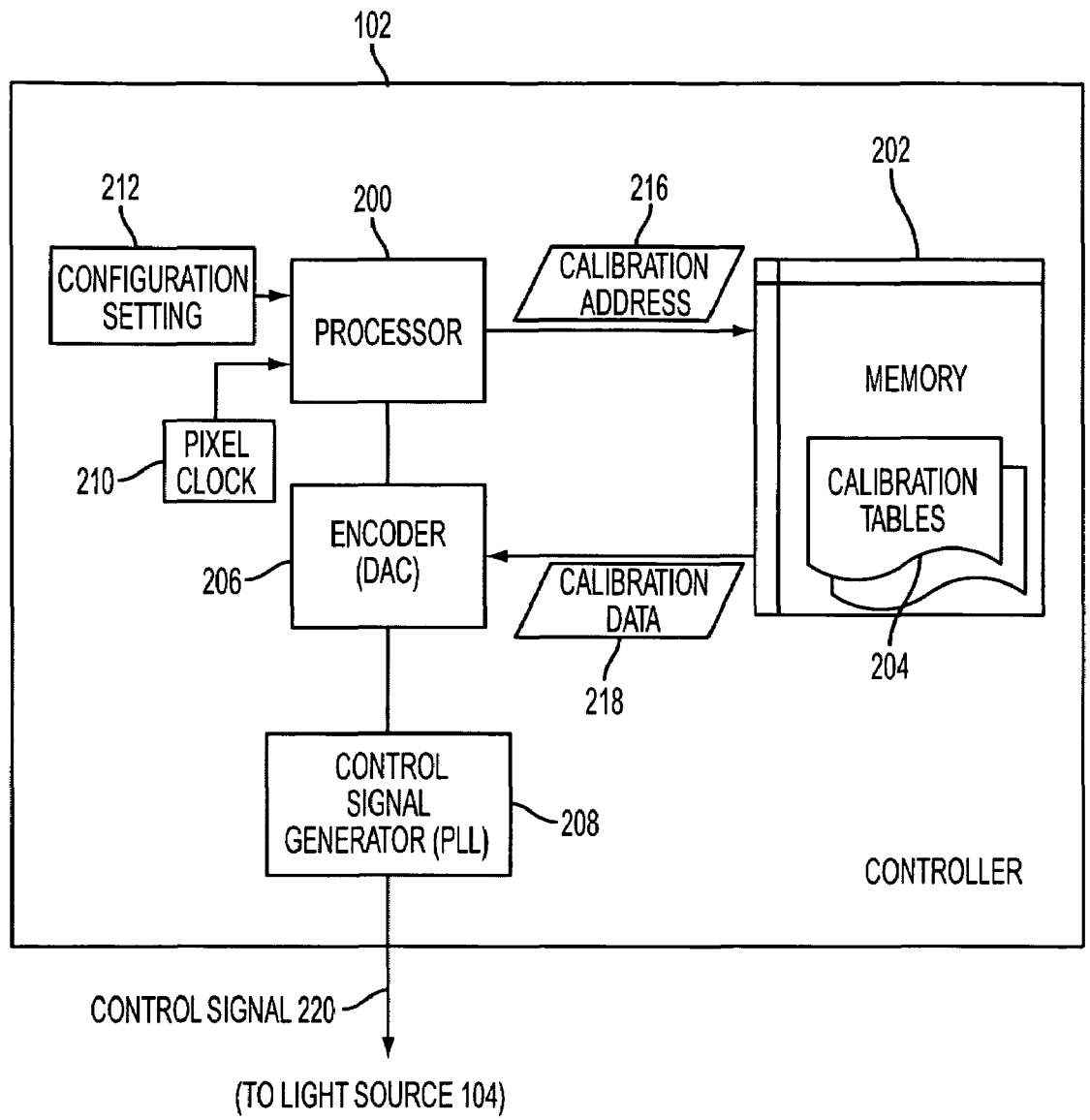
FIG. 2 illustrates an exemplary ROS controller that is in accordance with embodiments of the present invention.

FIG. 2 illustrates an exemplary structure for controller 102 that is in accordance with embodiments of the present invention. As shown, controller 102 may comprise a processor 200, a memory 202 that stores one or more calibration tables 204, an encoder 206, an encoder 206, a control signal generator 208, and a pixel clock 210. These components may be implemented using state machines such FPGA components, CPLD, standard logic gates, ASICs, microprocessors, digital signal processors or other device capable of implementing state machines.

Processor 200 implements the logic and functions of controller 102. In particular, processor 200 may monitor the progress of a scan along a scan line based on the clock signal from pixel clock 210. From this information, processor 200 may thus determine the current position of a scan along the scan line. In some embodiments, processor 200 may encode scan line positions into 8-bit values.

Processor 200 may also be configured by configuration setting 212. In some embodiments, configuration setting 212 may be a value, such as a 12-bit value, that serves as a pointer to one of calibration tables stored in memory 202. Configuration setting 212 may be stored within memory 202 or retrieved by processor 200 from some other memory or storage (not shown).

Processor 200 may combine the scan line position and configuration setting 212 to determine calibration address 216. Calibration address 216 points to a location in memory 202 which indicates a location of calibration tables 204. Calibration data 218 may therefore be readily retrieved from memory 202 by processor 200.

As shown in FIG. 2, processor 200 may be implemented using well known components. For example, processor 200 may be a digital circuit, such as a FPGA or CPLD. Of course, one skilled in the art will recognize that processor 200 may be implemented using other types of hardware, firmware, or software.

Memory 202 holds the data and information used by controller 102. In some embodiments, memory 202 may be implemented as a ROM, which is well known to those skilled in the art. In these embodiments, memory 202 may be configured such that its addresses are reflective of scan line parameters. For example, one portion of the address may correspond to positions of a scan line and a second portion of the address may indicate a pointer to specific calibration curve data in calibration tables 204.

Of course, memory 202 may be implemented using other forms of memory, such as a programmable read-only memory (PROM), erasable programmable read-only memory (EPROM), electrically erasable programmable read-only memory (EEPROM), or a content addressable memory (CAM). As another example, memory 202 may be a volatile memory, such as random access memory (RAM), which is uploaded with data retrieved from storage (not shown) or another memory (not shown) coupled to controller 102.

Calibration tables 204 store information and data related to correcting or minimizing the scan non-linearity of ROS 100. For example, calibration tables 204 may represent families of possible frequency shifts to the frequency of pixel clock 210 versus relative time within a scan line interval. As noted, such calibration curves are well known to those skilled in the art to correct or minimize scan non-linearity.

Encoder 206 formats the calibration data provided from processor 200. For example, encoder 206 may convert the calibration data into an analog value or voltage. Encoder 206 may be implemented as a digital-to-analog converter (DAC), which is well known to those skilled in the art. In some embodiments, encoder 206 is a DAC that converts calibration data 218 into control voltage (VCO).

Control signal generator 208 generates the control signal that is delivered to light source 104. For example, control signal generator 208 may be implemented as a phase-locked loop that is controlled by the VCO output of encoder 206. Of course, one skilled in the art will recognize that other components may be used to generate a control signal.

Pixel clock 210 provides a clock signal (or pulse train) that is used by processor 200 to control the light beam emitted by light source 104 on and off at each pixel position along the scan line. As noted, processor 200 may vary the timing of light source 104 to control pixel placement along the scan line. Pixel clock 210 may be implemented using well known components.

Figure 3:
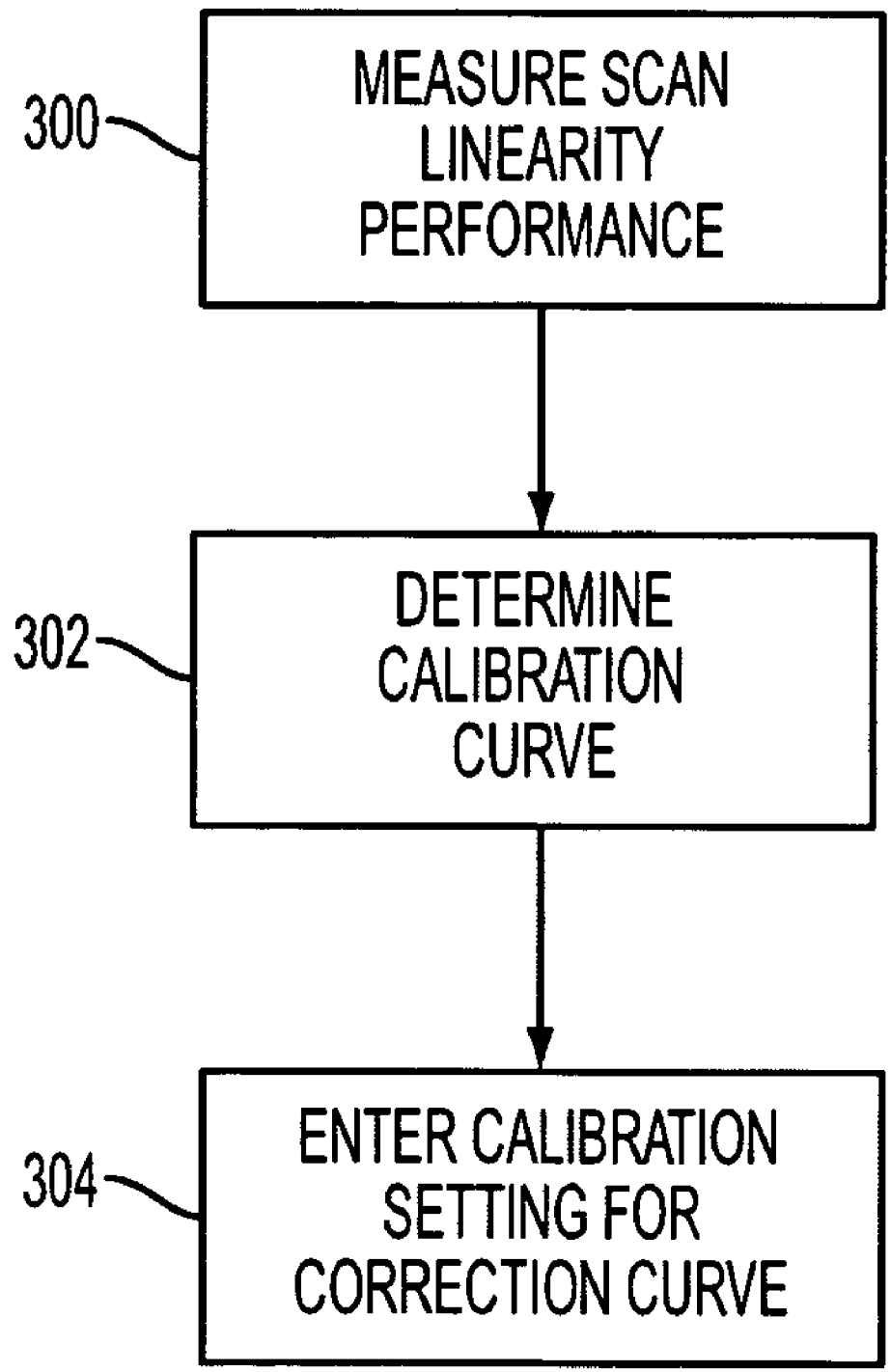
FIG. 3 illustrates an exemplary process flow for calibrating a ROS in accordance with embodiments of the present invention.

FIG. 3 illustrates an exemplary process flow for calibrating ROS 100 in accordance with embodiments of the present invention. In general, the calibration process of the present process takes advantage of ROS 100 being configured with a local memory 202 that is sized to hold a plurality of calibration curves. For example, based on known components, memory 202 may hold over 4096 calibration curves. Of course, memory 202 may hold any number of calibration curves. Accordingly, this allows ROS 100 to be calibrated efficiently and with relatively low effort since the calibration data is resident on ROS. One example of how such a calibration process can be performed will now be described.

In stage 300, the scan non-linearity of ROS 100 may be measured. A technician may measure ROS 100 using well known techniques. For example, the technician may input one or more registration images to ROS 100 and measure the scan non-linearity that exists in the output. This process may be performed prior to shipping ROS 100 or when a printing system with ROS 100 has been installed at a customer site. Of course, ROS 100 may also be measured any number of times. Processing may then flow to stage 302.

In stage 302, a calibration curve may be determined for ROS 100. For example, the technician may determine a scan non-linearity profile for ROS 100 based on the measurements from stage 300. The technician may then select a calibration curve that corrects or minimizes the scan non-linearity found in ROS 100. For example, the technician may use a software tool that calculates a data smoothing polynomial that corresponds to the scan non-linearity and then calculates corresponding frequency shifts to the frequency provided by pixel clock 210. As another example, the technician may select from a catalog of calibration curves. In some embodiments, each calibration curve may be assigned a unique identifier or number that is formatted based on 12-bit values. Processing may then flow to stage 304.

In stage 304, configuration setting 212 is set to indicate the calibration curve selected. For example, the technician may enter the unique identifier of the calibration into ROS 100 or other type of interface coupled to ROS 100. Consequently, in some embodiments ROS 100 may be calibrated by simply entering a single parameter, i.e., configuration setting 212.

Figure 4:
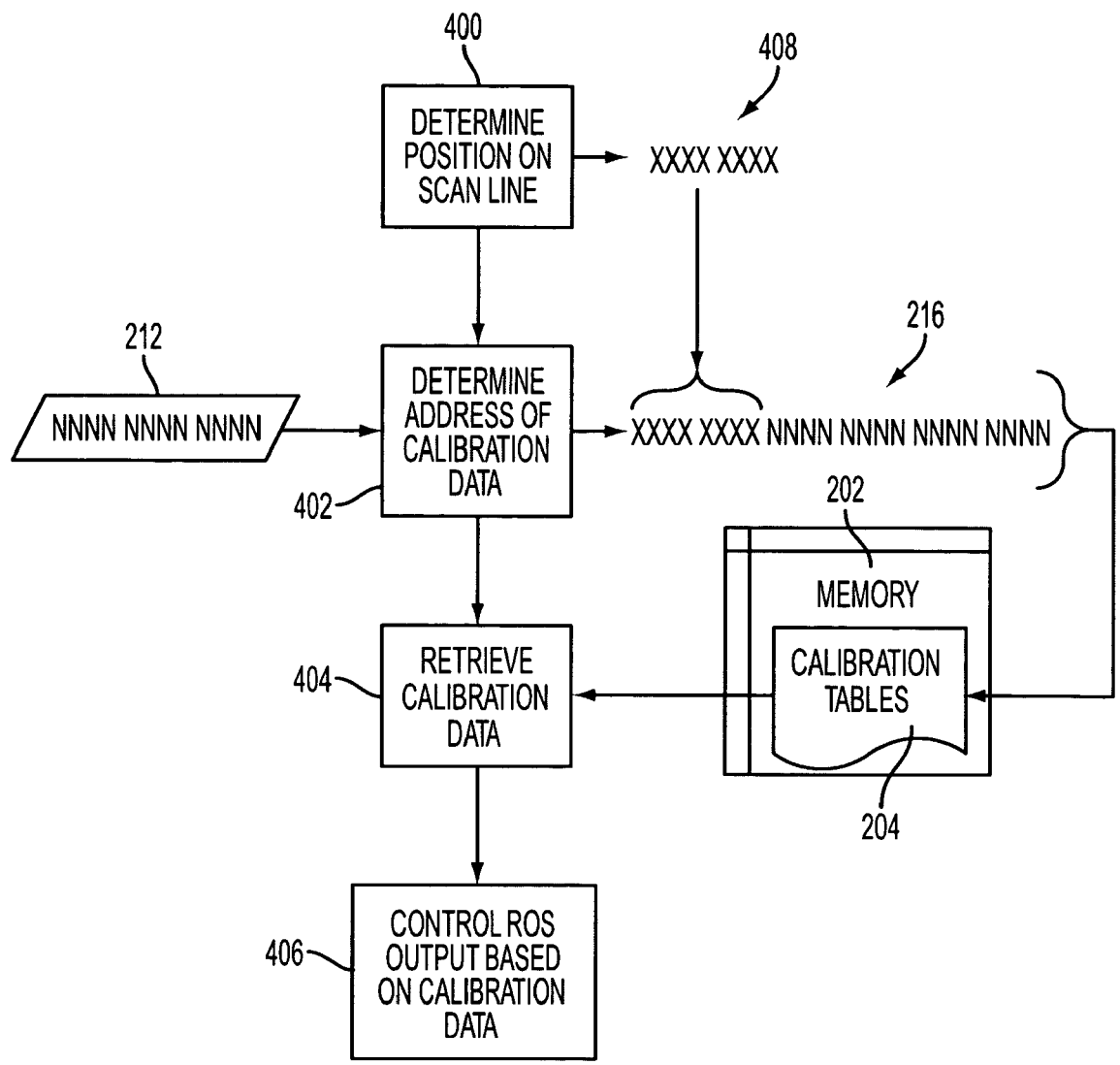
FIG. 4 illustrates an exemplary process flow for controlling a ROS in accordance with embodiments of the present invention.

FIG. 4 illustrates an exemplary process flow for controlling ROS 100 in accordance with embodiments of the present invention. As shown, in stage 400, controller 102 determines its current position along the scan line. For example, processor 200 may calculate its current position based on the clock signal from pixel clock 210. In some embodiments, processor 200 may encode the current position along the scan line as an 8-bit value, such as position value 408. Of course, one skilled in the art will recognize that any size value may be used by processor 200. Processing may then flow to stage 402.

In stage 402, processor 200 determines calibration address 216 in memory 202. As noted, memory 202 may be programmed to hold a plurality of calibration curves that indicate frequencies that correct or minimize scan non-linearity. Processor 200 may determine calibration address 216 by combining the position value 408 with configuration setting 212. For purposes of illustration, configuration setting 212 is shown as a 12-bit value. However, one skilled in the art will recognize that other size values may be used for configuration setting 212.

In some embodiments, processor 200 uses position value 408 as the most significant bits and configuration setting 212 as the least significant bits. Processor 200 may be configured in this manner in order to minimize the number processing steps and maximize the speed at which calibration address 216 can be determined. Other addressing schemes may still be used in other embodiments of the present invention. Processing may then flow to stage 404.

In stage 404, processor 200 accesses memory 202 at address 216. Processor 200 may then retrieve calibration data 218 from calibration tables 204. Of note, calibration data 218 is matched to the current scan line position and scan non-linearity of ROS due to the format of address of 216, which contains these scan line parameters. Therefore, processor 200 can retrieve calibration data 218 directly by simply processing address 216.

In stage 406, controller 102 controls light source 104 based on calibration data 218. In particular, processor 200 provides calibration data 218 to encoder 206. In turn, encoder 206 may convert calibration data 218, which is in the form of frequency data, into an analog voltage VCO. Encoder 206 may feed this voltage to signal generator 208. As noted, in some embodiments, signal generator 208 may be implemented as a phase-locked loop that outputs varying frequency signal based on VCO. ROS 100 may then continue its operation by repeating the processing at stage 400.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

It will be apparent to those skilled in the art that various modifications and variations can be made to the embodiments of the disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A method of correcting a scan non-linearity of an imaging device, said method comprising:
    determining a current position along a scan line;
    retrieving a selling of the imaging device that identifies one of a plurality of calibration profiles stored on the imaging device;
    determining an address for calibration data based on the current position and the retrieved selling, wherein the calibration data is configured to correct for a scan non-linearity profile;
    retrieving the calibration data based on the address; and
    controlling an output of the imaging device based on the calibration data.

2. The method of claim 1, wherein retrieving the selling of the imaging device comprises retrieving a selling that is predetermined.

3. The method of claim 1, wherein determining the address for the calibration data comprises combining the current position with the setting into a single value.

4. The method of claim 1, wherein determining the address for the calibration data comprises combining the current position with the setting into a single value, wherein the current position is placed into most significant bits of the single value and the selling is placed into least significant bits of the single value.

5. The method of claim 1, wherein retrieving the calibration data based on the address comprises:
    accessing a memory resident on the imaging device and holding the plurality of configuration profiles that are identified by the setting; and
    retrieving the calibration data from the calibration profile indicated in the address.

6. The method of claim 1, wherein retrieving the calibration data based on the address comprises accessing a read-only memory resident on the imaging device and holding a plurality of configuration profiles that are identified by the setting.

7. An imaging device configured to correct its scan non-linearity according to the method of claim 1, said imaging device comprising:
    means for determining a current position along a scan line;
    means for retrieving a setting of the imaging device;
    means for determining an address for calibration data based on the current position and the retrieved setting, wherein the calibration data is configured to correct for a scan non-linearity profile;
    means for retrieving the calibration data based on the address; and
    means for controlling an output of the imaging device based on the calibration data.

8. An imaging device, comprising:
    a memory configured to hold a plurality of calibration profiles;
    a state machine configured to determine a current position along a scan line, retrieve a setting that identifies one of the calibration profiles, and retrieve calibration data from the memory based on an address that is based on the current position and the setting, wherein the calibration data is configured to correct for a scan non-linearity profile;
    an encoder configured to convert the calibration data into a voltage;
    a signal generator configured to output a control signal with a frequency that is based on the voltage from the encoder; and
    a light source that emits light based on the control signal.

9. The imaging device of claim 8, wherein the memory is a read-only memory.

10. The imaging device of claim 8, wherein the state machine is a processor that comprises a complex programmable logic device that is programmed to retrieve calibration data from the memory at the address in which the current position is the most significant bits and the setting is the least significant bits of the address.

11. The imaging device of claim 8, wherein the encoder is a digital-to-analog encoder.

12. The imaging device of claim 8, wherein the signal generator is a phase-locked loop.

* * * * *